United States Patent
Sui et al.

(10) Patent No.: US 10,030,091 B2
(45) Date of Patent: Jul. 24, 2018

(54) SYNTHESIS OF ORGANIC-INORGANIC HYBRID WATER SOLUBLE POLYMERS IN OIL FIELD APPLICATIONS

(71) Applicant: M-I L.L.C., Houston, TX (US)

(72) Inventors: Changping Sui, The Woodlands, TX (US); Balakrishnan Panamarathupalayam, Houston, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 14/901,118

(22) PCT Filed: Sep. 11, 2014

(86) PCT No.: PCT/US2014/055159
§ 371 (c)(1),
(2) Date: Dec. 28, 2015

(87) PCT Pub. No.: WO2015/038750
PCT Pub. Date: Mar. 19, 2015

(65) Prior Publication Data
US 2016/0152753 A1    Jun. 2, 2016

Related U.S. Application Data

(60) Provisional application No. 61/876,683, filed on Sep. 11, 2013.

(51) Int. Cl.
| | | |
|---|---|---|
| C08F 226/08 | (2006.01) |
| C08F 230/08 | (2006.01) |
| C08F 220/56 | (2006.01) |
| C08F 226/10 | (2006.01) |
| C08F 220/58 | (2006.01) |
| C08F 236/22 | (2006.01) |
| C08F 220/54 | (2006.01) |
| C08F 236/20 | (2006.01) |
| C08K 5/5425 | (2006.01) |
| C08F 216/12 | (2006.01) |

(52) U.S. Cl.
CPC .......... *C08F 230/08* (2013.01); *C08F 220/56* (2013.01); *C08F 220/58* (2013.01); *C08F 226/10* (2013.01); *C08F 216/125* (2013.01); *C08F 220/54* (2013.01); *C08F 236/20* (2013.01); *C08F 236/22* (2013.01); *C08F 2220/585* (2013.01); *C08F 2230/085* (2013.01); *C08K 5/5425* (2013.01)

(58) Field of Classification Search
CPC .... C08F 220/54; C08F 220/56; C08F 220/58; C08F 2220/585; C08F 230/08; C08F 2230/085; C08F 236/22; C08F 236/20
See application file for complete search history.

(56) References Cited

U.S. PATENT DOCUMENTS

| | | | | |
|---|---|---|---|---|
| 5,156,914 A | * | 10/1992 | Shih .................... | A61K 8/11 264/4.3 |
| 5,268,112 A | | 12/1993 | Hutchins et al. | |
| 5,280,054 A | * | 1/1994 | Sakai ................ | C09D 151/10 523/500 |
| 5,510,439 A | * | 4/1996 | Shetty ................ | B01D 17/00 252/182.14 |
| 5,607,985 A | * | 3/1997 | Masuhara ............. | C08F 2/50 156/327 |
| 6,528,590 B1 | | 3/2003 | Beyer et al. | |
| 2004/0052746 A1 | * | 3/2004 | Tamareselvy ........ | A61K 8/8158 424/70.11 |
| 2008/0199416 A1 | * | 8/2008 | Nguyen Kim ........ | A61K 8/046 424/70.11 |
| 2012/0065333 A1 | | 3/2012 | Li et al. | |
| 2012/0152459 A1 | * | 6/2012 | Avramidis ............ | C09J 163/00 156/334 |
| 2013/0129658 A1 | | 5/2013 | Nguyen-Kim et al. | |

FOREIGN PATENT DOCUMENTS

| | | | | |
|---|---|---|---|---|
| WO | WO 2011135039 A1 | * | 11/2011 | ........... A61K 8/8147 |

OTHER PUBLICATIONS

International Search Report and Written Opinion for the equivalent International patent application PCT/US2014/055159 dated Dec. 22, 2014.
International Preliminary Report on Patentability for the equivalent International patent application PCT/US2014/055159 dated Mar. 24, 2016.

* cited by examiner

*Primary Examiner* — Ling Choi
*Assistant Examiner* — David L Miller
(74) *Attorney, Agent, or Firm* — David J. Smith

(57) ABSTRACT

Compositions may include a monomer, an organic crosslinker, an inorganic crosslinker, and an initiator. Furthermore, compositions may include at least one monomer and triethoxyvinylsilane (TEVS) to provide crosslinking among the at least one monomer.

9 Claims, No Drawings

SYNTHESIS OF ORGANIC-INORGANIC HYBRID WATER SOLUBLE POLYMERS IN OIL FIELD APPLICATIONS

This application claims the benefit of U.S. Provisional Application No. 61/876,683 filed on Sep. 11, 2013, incorporated by reference herein in its entirety.

BACKGROUND

Annular fluids, also known as packer fluids or insulating packer fluids, are liquids which are pumped into annular openings such as, for example, (1) between a wellbore wall and a casing, (2) between adjacent, concentric strings of pipe extending into a wellbore, or (3) into the bore of a cased wellbore. In the completion of oil and gas wells, it is currently the practice to place aqueous or non-aqueous hydrocarbon based fluids, such as packer fluids, into a casing annulus above a packer, specifically where the packer has been set to isolate production fluid from the casing annulus. Packer fluids, introduced into the casing annulus around a production pipe, fill the annular column to surface. Packer fluids are utilized for various reasons, such as, to provide both pressure stability and thermal protection to the casing annulus of production oil and gas wells as well as in injection wells, to provide hydrostatic pressure to lower pressure across the sealing element and to equalize pressure relative to the formation, to lower differential pressure on the wellbore and/or casing to prevent collapse, and to protect metals and elastomers from corrosion. Packer fluids may further be used to control heat loss, both conductive and convective heat losses. Thus, insulating packer fluids may be utilized in oil or gas well construction operations conducted in low temperature venues of the world, for example, those areas having permafrost.

Heavy oil production is an operation which often can benefit from the use of an insulating packer fluid. In heavy oil production, a high-pressure steam or hot water is injected into the well and the oil reservoir to heat the fluids in the reservoir, causing a thermal expansion of the crude oil, an increase in reservoir pressure and a decrease of the oil's viscosity. In this process, damage to the well casing may occur when heat is transferred through the annulus between the well tubing and the casing. The resulting thermal expansion of the casing can break the bond between the casing and the surrounding cement, causing leakage. Accordingly, an insulating medium such as a packer fluid may be used to insulate or to help insulate the well tubing. The packer fluid also reduces heat loss and saves on the energy requirements in stimulation using hot-water or steam (huff-n-puff) or in hot-water- or steam-flooding.

In addition to steam injection processes and operations which require production through a permafrost layer, subsea fields, such as in deep water, 1,500 to more than 6,000 feet deep, require specially designed systems, which may utilize an insulating packer fluid. For example, a subsea oil reservoir temperature may be between about 120° F. and 250° F., while the temperature of the water through which the oil may be conveyed is often as low as 32° F. to 50° F. Conveying the high temperature oil through such a low temperature environment can result in oil temperature reduction and consequently the separation of the oils into various hydrocarbon fractions and the deposition of paraffins, waxes, asphaltenes, and gas hydrates. The agglomeration of these oil constituents can cause blocking or restriction of the wellbore, resulting in a reduction or even catastrophic failure of the production operation.

Thus, there exist a need for compositions, such as packer fluids, for example, exhibiting good yield stress and long-term stability in high temperature environments.

SUMMARY

In one aspect, embodiments of the present disclosure are directed to a composition including a monomer, an organic crosslinker, an inorganic crosslinker, and an initiator.

In another aspect, embodiments of the present disclosure are directed to a composition including at least one monomer and triethoxyvinylsilane (TEVS) to provide crosslinking among the at least one monomer.

This summary is provided to introduce a selection of concepts that are further described below in the detailed description. This summary is not intended to identify features of the claimed subject matter, nor is it intended to be used as an aid in limiting the scope of the claimed subject matter. Other aspects of the present disclosure will be apparent from the following description and the appended claims.

DETAILED DESCRIPTION

Generally, the present disclosure relates to thermally stable organic-inorganic hybrid (swellable) copolymers synthesized for oil field applications. More particularly, the invention relates to the compositions comprising both organic and inorganic crosslinkers. The highly crosslinked nano-scale polymeric particles were obtained through cross-linking between monomers by organic crosslinker during polymerization while the inorganic crosslinker maintains inertia with absence of water and controlling the neutral reacting condition. The inorganic crosslinker incorporated into polymeric particles during polymerization crosslinks the copolymer particles through its hydrolysis and afterward condensation at the presence of water and temperature when preparing the final water-base fluids. The intra-and inter-crosslinking network from the organic and inorganic crosslinker provides the water-base fluid with excellent low shear viscosity/yield stress. One such use of copolymers and/or polymers discussed herein is as an insulating packer fluid, which may be emplaced within an annulus to prevent heat loss. A majority of annular heat loss is due to convection and conduction. Heat loss due to thermal conductivity may be controlled by proper selection of fluids, while heat loss due to convection can be arrested or substantially diminished by increasing the low shear viscosity/yield stress of the selected fluid.

In certain aspects, disclosed embodiments relate to polymers and/or copolymers, used as insulating packer fluids, drilling fluids, or the like, containing monomers crosslinked by organic-inorganic crosslinkers including, but not limited to triethoxyvinylsilane (TEVS). Packer fluids according to embodiments disclosed herein may have relatively high densities, and may be adapted to survive in high temperature and/or high pressure wells. Further, insulating packer fluids in accordance with disclosed embodiments may possess low thermal conductivity, increased viscosity, and high stability under elevated temperatures.

Monomers

Depending on the application, the swellable polymer and/or copolymer may be composed of monomers, including nonionioc monomers, that may comprise a vinyl amide group. As examples only, monomers herein may include 2-acrylamido-2-methylpropanesulfonate also known as 2-acrylamido-2-methylpropane sulfonic acid (AMPS), acrylamide (AM), methacrylamide, N,N dimethyl acrylamide (DMAM), N,N dimethyl methacrylamide, tetrafluoroethylene, dimethylaminopropyl methacrylamide, N-vinyl-2-pyrrolidone, N-vinyl-3-methyl-2-pyrrolidone, N-vinyl-4,4-diethyl-2-pyrrolidone, 5-isobutyl-2-pyrrolidone, N-vinyl-3-methyl-2-pyrrolidone, alkyl oxazoline, poly(2-ethyl-2-oxazoline), $C_2$-$C_{12}$ olefins, ethylene, propylene, butene, butadiene, vinyl aromatics, styrene, alkylstyrene, acrylic acid, methacrylic acid, vinyl alcohol, partially hydrolyzed acrylamide or methacrylamide, and derivatives or mixtures thereof. In yet other embodiments, swellable polymers and/or copolymers may include polyalkylene amines and polyethers such as polyethylene oxide and polypropylene oxide.

An example of a monomer, acrylamide (AM), in amounts of from about 5 wt % to 50 wt %, for example, may be represented by the formula $C_3H_5NO$ (MW=71.08; ρ=1.13) and have the structural formula, for example, as shown below:

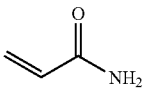

In other embodiments, the monomer can also be vinyl pyrrolidone (VP), N-methylacrylamide, N-isopropylacrylamide, N-butylacrylamide, N,N-dimethylacrylamide, hydroxymethylacrylamide, N-hydroxymethylacrylamide, and other N-alkylacrylamides. Water-soluble salt forms of the carboxylic acids are also within purview of the present disclosure.

In yet other embodiments, a further example of a monomer, 2-acrylamido-2-methylpropanesulfonate also known as 2-acrylamido-2-methylpropane sulfonic acid (AMPS) or 3-allyloxyhydroxypropanesulfonate (AHPS), in amounts of from about 5 wt % to 50 wt %, may be represented by the formula $C_7H_{13}NO_4S$ (MW=207.25; ρ=1.1) and have the structural formula, for example, as shown below:

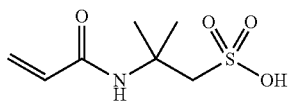

AMPS may provide enhanced thermal stability, as compared to AM, and may provide salinity tolerance for the resulting polymers.

In some embodiments, another monomer, N-vinylpyrrolidone (VP), in amounts of from about 1 wt % to 60 wt %, may be represented by the formula $C_6H_9NO$ (MW=111.14; ρ=1.043) and have the structural formula, for example, as shown below:

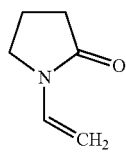

VP may be replaced by N-vinyl-3-methyl-2-pyrrolidone, N-vinyl-4,4-diethyl-2-pyrrolidone, 5-isobutyl-2-pyrrolidone, N-vinyl-3-methyl-2-pyrrolidone, in other embodiments.

The polymeric and/or copolymeric particles may be prepared from the aforementioned monomers by methods known in the art, including invert emulsion polymerization, and the like. Particle suspension may be prepared by mixing particles with suspension fluids, or if present in an inverse emulsion addition additives such as surfactants, for example.

Inorganic Crosslinker

Polymers and/or copolymers herein may comprise an inorganic crosslinker such as, for example, triethoxyvinylsilane (TEVS). TEVS or trimethoxyvinylsilane, as another example inorganic crosslinker, may be in amounts from about 1 wt % to 15 wt %, for example, which forms an inorganic phase in the packer fluid and may act as an inorganic gelling agent in a water based fluid for use in oilfield applications, and/or in an insulating packer fluid for completions, viscosifier, and fluid additive for drilling. TEVS may provide a gelled structure, similar that of xanthan, when dispersing the swellable tetrapolymer into water or brine, for example. Hydrolysis of TEVS produces Si—OH groups and polycondensation of —OH groups on the different swellable polymer particles generating networks among the polymer particles to provide the gelling structure. TEVS may also provide thermal stability to an aqueous fluid, such as in an insulating packer fluid, for the oilfield. Likewise, the presence of TEVS in the copolymer may increase the thermal stability of the polymer. In embodiments, TEVS may be represented by the formula $H_2C{=}CHSi(OC_2H_5)_3$ (MW=190.31; ρ=0.903) and have the structural formula, for example, as shown below:

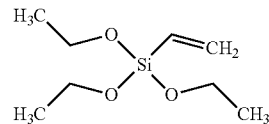

The present disclosure provides the combination of TEVS with a water-soluble polymer as utilized in an oilfield application. It is further contemplated that metals other than Si may be utilized in structures analogous to TEVS to serve as a inorganic crosslinker.

Disclosed herein, polymeric and/or co-polymeric particles made from monomers are crosslinked with stable inorganic crosslinkers (e.g., TEVS), allowing swelling in situ. As such, the swelled polymers and/or copolymers contain exposed hydrophobic groups which associate with one another and form a swelled hydrophobically associative polymer having inter- and intra-molecular junctions to promote increased viscosity relative to comparable polymers at the same concentration in a fluid. Polymers and/or copolymers herein may have use in enhanced oil recovery possessing hydrophilic properties while having hydrophobic groups attached.

Organic Crosslinker

Polymers and/or copolymers in accordance with embodiments disclosed herein may include one or more organic crosslinkers which include, for example, pentaerythritol allyl ether (PAE), in amounts from about 0.5 mol % to 1.5 mol %, for example, N,N'-ethylene-bisacrylamide, and/or N,N'-methylene-bisacrylamide. In embodiments, PAE may be represented by the formula $C_{17}H_{28}O_4$ and have the structural formula, for example, as shown below:

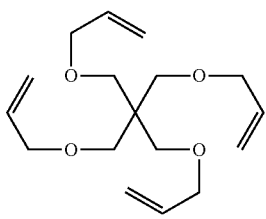 [SMILES: C=CCOCC(COCC=C)(COCC=C)COCC=C]

The structure of PAE provides 3-4 unsaturated vinyl groups to provide organic crosslinking network among the polymeric particles. PAE may be characterized by relatively low NaCl tolerance.

Initiator

Polymers and/or copolymers in accordance with embodiments disclosed herein may include one or more initiators which include a nitrile functional group. Examples of possible initiators may include, but are not limited to, 2,2'-azobis(2-methylpropionitrile) or azobisisobutyronitrile (AIBN) in amounts from about 0.05 mol % to 0.2 mol %, for example. Other initiators include, but are not limited to, 2,2'-azobis(isobutyramidine hydrochloride), 2,2'-azobis[2-(2-imidoazolin-2-yl)propane]dihydrochloride, 1,1'-azobis(cyclohexanecarbonitrile), 2,2'-azobis(2-methylpropionamidine)dihydrochloride, 4,4'-azobis(4-cyanovaleric acid), 4,4'-azobis(4-cyanovaleric acid), ammonium persulfate, hydroxymethanesulfinic acid monosodium salt dihydrate, potassium persulfate, sodium persulfate, benzoyl peroxide, 1,1-bis(tert-amylperoxy)cyclohexane, 1,1-bis(tert-butylperoxy)-3,3,5-trimethylcyclohexane, 1,1-bis(tert-butylperoxy)cyclohexane, 2,2-bis(tert-butylperoxy)butane, 2,4-pentanedione peroxide, 2,5-bis(tert-butylperoxy)-2,5-dimethylhexane, 2,5-di(tert-butylperoxy)-2,5-dimethyl-3-hexyne, 2-butanone peroxide, and/or cumene hydroperoxide.

An initiator may initiate polymerization by generating a free radical at a temperature of decomposition of the polymer, thereby providing bonding between the free radical and monomer. In embodiments, 2,2'-azobis(2-methylpropionitrile) or AIBN may be represented by the formula $C_8H_{12}N_4$ and have the structural formula, for example, as shown below:

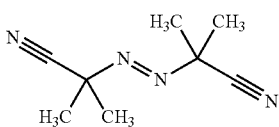

Procedure of Polymerization

The following procedure was followed to prepare an organic-inorganic hybrid copolymer in tert-butyl alcohol (TBA). A three-neck flask, equipped with a condenser and mechanical stirrer, was filed with TBA and AMPS. To neutralize the AMPS, equivalent and 5% more mole of ammonia in ammonium hydroxide solution (28~30% $NH_3$ basis) was added to the previously mentioned mixture. The mixture was heated to 140° F. with agitation and kept at this temperature for 30 min or until AMPS was completely dissolved in the solvent. The remaining monomers AM, VP, TEVS and crosslinker PAE were added to the mixture. The mixture was purged with $N_2$ for 30 min. A solution of AIBN was added to the reaction system and the reaction was kept at this temperature under $N_2$ and stirred for at least 6 hours. Table 15 shows typical formulas of terpolymer or tetrapolymer with various ratios of monomers and crosslinker.

EXAMPLE 1

A three-neck flask (250 ml), equipped with a condenser and mechanical stirrer, was filed with TBA (115 ml), AMPS (5 g) and ammonium hydroxide (1.65 ml) (28~30% $NH_3$ basis). The mixture was heated to 140° F. with agitation and kept at this temperature for 30 min or until AMPS was completely dissolved in the solvent. The remaining monomers AM (3.5 g), VP (1.0 g), TEVS (0.5 g) and crosslinker PAE (0.15 g) were added to the mixture. The mixture was purged with $N_2$ for 30 min. Then a solution of AIBN (0.033 g in 5 ml TBA) was added to the reaction system and the reaction was kept at this temperature under $N_2$ and stirred for at least 6 hours. A slurry of polymeric particles dispersing in TBA solvent was obtained.

EXAMPLE 2

The same procedure as in Example 1 was utilized, except that 0.30 g of PAE was added to the reaction system.

EXAMPLE 3

The same procedure as in Example 1 was utilized, except that 4.0 g of AMPS and 1.9 ml ammonium hydroxide solution was added to the reaction system and no VP was added.

EXAMPLE 4

The same procedure as in Example 1 was utilized, except that 3 g of AM, 2.0 g of VP, 0.125 g of PAE, 4.5 g of AMPS and 2.2 ml ammonium hydroxide solution were added to the reaction system.

EXAMPLE 5

The same procedure as in Example 1 was utilized, and the same monomer composition as in Example 4, except that 0.25 g of PAE was added to the reaction system.

EXAMPLE 6

The same procedure as in Example 1 was utilized, and the same monomer composition as in Example 5 was used, except that 0.15 g of VP and 1.0 G TEVS were added to the reaction system.

TABLE 1

| Formula of terpolymer and tetrapolymers | | | | | | |
|---|---|---|---|---|---|---|
| Component | #1 | #2 | #3 | #4 | #5 | #6 |
| AM (g) | 5.0 | 5.0 | 5.0 | 3.0 | 3.0 | 3.0 |
| AMPS (g) | 3.5 | 3.5 | 4.0 | 4.5 | 4.5 | 4.5 |
| VP (g) | 1.0 | 1.0 | 1.0 | 2.0 | 2.0 | 1.5 |
| TEVS (g) | 0.5 | 0.5 | 0 | 0.5 | 0.5 | 1.0 |
| PAE (mol %) | 0.5 | 1.0 | 0.5 | 0.5 | 1.0 | 1.0 |

Six water base SafeTherms named STH#1 through STH#6 were prepared by dispersing the corresponding copolymers listed in Table 1 in 12.0 ppg NaBr brine. The formulation of the fluids is listed below.

| copolymer | 8 ppb |
|---|---|
| ECF 2597 | 0.1 bbl |
| 12 ppg NaBr | 0.9 bbl |
| $Na_2CO_3$ | 5 ppb |
| $NaHCO_3$ | 10 ppb |

Formulation of SafeTherms:

where ECF 2597 is a thermal stabilizer containing 20 v % of triethanolamine and 80 v% of ethylene glycol and the combination of 5 ppb $Na_2CO_3$ and 10 ppb $NAHCO_3$ is a pH buffer. The fluids were formulated using the formula above with the except STH#4, which does not have pH buffer. It was observed that the freshly made fluids did not exhibit a gelled structure. The gelled structure was developed after either hot rolling at 180° F. for 2~4 hours or setting the fluids overnight at room temperature. STH#1 through #4 were hot rolled at 180° F. for 2~4 and STH#5 and STH#6 were set at room temperature overnight before taking rheological measurements.

The SafeTherms were put in an oven at either 250° F. or 300° F. for static aging. The aging results were represented in Tables 2-4. Table 2 listed the rheology of samples before static aging. As seen in table 2, the SafeTherms exhibited positive low shear rheology and yield stress with the except of STH#3, which is a terpolymer without TEVS compared to the remaining tetrapolymers. Visually, STH#3 does not show a gelled structure after 5 hours of hot rolling. This implies that TEVS is the component providing the gelled structure and resulting in good low end rheology of the fluid. Tables 3 and 4 listed 1 week and 1 month static aging data, respectively. Compared to the data for unaged samples listed in Table 2, the rheology data for the samples after 1 week aging increased with the exception of STH#4 as seen in Table 3. The increase in rheology may be caused by the further yield of copolymer at a particular temperature or by the further gelling reaction between TEVS and different polymer particles. The slight decrease of rheology of STH#4 is due to the absence of pH buffer in the fluid. Comparing the rheological profiles between STH#1 and STH#2 for both an unaged sample and a one week aged sample, it can be concluded that the double organic crosslinker of STH#2 against STH#1 increases the rheology of the fluid, particularly for the low shear rheology. It may not be comparable between STH#4 and STH#5 due to the different formulations of those two fluids, particularly since STH#4 does not contain pH buffer.

TABLE 2

Rheology of unaged samples

| Fann 35 | STH#1 | STH#2 | STH#3 | STH#4 | STH#5 | STH#6 |
|---|---|---|---|---|---|---|
| 600 RPM | 265 | 340 | 137 | 250 | 188 | 215 |
| 300 RPM | 195 | 255 | 88 | 175 | 139 | 153 |
| 200 RPM | 165 | 215 | 68 | 140 | 116 | 124 |
| 100 RPM | 120 | 165 | 44 | 105 | 85 | 86 |
| 6 RPM | 50 | 85 | 9 | 45 | 31 | 32 |
| 3 RPM | 45 | 80 | 7 | 40 | 28 | 27 |
| PV | 70 | 85 | 49 | 75 | 49 | 62 |
| YP | 125 | 170 | 39 | 100 | 90 | 91 |
| $\tau_0$ | 28.96 | 65.11 | 2.6 | 33.21 | 12.61 | 15.79 |

TABLE 3

Rheology of samples after static aging at 250° F. for 1 week

| Fann 35 | STH#1 | STH#2 | STH#2 | STH#5 | STH#6 |
|---|---|---|---|---|---|
| 600 RPM | 465 | 450 | 233 | 271 | 340 |
| 300 RPM | 315 | 330 | 163 | 203 | 250 |
| 200 RPM | 260 | 275 | 130 | 168 | 210 |
| 100 RPM | 180 | 210 | 89 | 127 | 150 |
| 6 RPM | 60 | 90 | 31 | 46 | 60 |
| 3 RPM | 55 | 85 | 27 | 41 | 55 |
| PV | 150 | 120 | 70 | 68 | 90 |
| YP | 165 | 210 | 93 | 135 | 160 |
| $\tau_0$ | 39.63 | 61.52 | 19.14 | 15.10 | 31.88 |

It also can be seen from Table 2 that 5 wt % more TEVS in formula #6 compared to that of formula #5 provides STH#6 with relatively high viscosity in both end of shear. In addition, the higher content of AM (50 wt %) in copolymers #1 and #2 endows the corresponding SafeTherms SHT#1 and STH#2 with higher viscosity compared to the rest of the samples containing lower content of AM (30 wt %). As seen in Table 4, the samples after 1 month aging maintain similar rheological profiles to those of 1 week aging with the exception of STH#6, which shows a rheological drop at both ends. This indicates that increasing TEVS in the copolymer does not improve its thermal stability although it increases the viscosity for the fresh sample.

TABLE 4

Rheology of samples after static aging at 250° F. for 1 month

| Fann 35 | STH#1 | STH#2 | STH#4 | STH#5 | STH#6 |
|---|---|---|---|---|---|
| 600 RPM | 430 | 435 | 252 | 273 | 276 |
| 300 RPM | 300 | 312 | 174 | 203 | 201 |
| 200 RPM | 250 | 255 | 139 | 172 | 162 |
| 100 RPM | 175 | 192 | 95 | 127 | 117 |
| 6 RPM | 65 | 84 | 35 | 47 | 45 |
| 3 RPM | 60 | 75 | 30 | 41 | 42 |
| PV | 130 | 123 | 78 | 70 | 75 |
| YP | 170 | 189 | 96 | 133 | 126 |
| $\tau_0$ | 42.94 | 59.25 | 20.73 | 18.28 | 23.48 |

Table 5 shows data of 2 months aging at 250° F. Compared to 1 month aging data, STH#1 shows about 10% rheology drop at both ends and measurements of the remaining samples were constant indicated by the similar rheology profiles shown in Tables 4 and 5. Comparing the compositions of copolymer #1 and #2 and aging profiles of STH#1 and STH#2, it can be concluded that the increase of organic crosslinker improves not only the rheology of the Safe-Therm but also its thermal stability.

TABLE 5

Rheology of samples after static aging at 250° F. for 2 months

| Fann 35 | STH#1 | STH#2 | STH#4 | STH#5 | STH#6 |
|---|---|---|---|---|---|
| 600 RPM | 390 | 450 | 268 | 315 | 295 |
| 300 RPM | 270 | 321 | 182 | 231 | 212 |
| 200 RPM | 219 | 264 | 144 | 192 | 170 |
| 100 RPM | 153 | 195 | 98 | 141 | 119 |
| 6 RPM | 60 | 84 | 35 | 51 | 41 |
| 3 RPM | 54 | 75 | 30 | 45 | 39 |
| PV | 120 | 129 | 86 | 84 | 83 |
| YP | 150 | 192 | 96 | 147 | 129 |
| $\tau_0$ | 41.1 | 58.95 | 21.56 | 21.73 | 18.53 |

The static aging at 300° F. was also conducted for samples of STH#2, STH#5, and STH#6. The 2 weeks and 1 month aging data were listed in Tables 6 and 7, respectively. The aging data in both tables indicates that STH#5 maintains it thermal stability after 1 month aging at 300° F. However, the other two samples show thermal instable by indicating a drop in rheology from 2 weeks to 1 month aging although both samples show thermal stability after 2 months of aging at 250° F. Those aging results indicate that a 50 degree increase in temperature from 250 to 300° F. accelerates the hydrolysis of AM and AMPS and subsequently results in thermal instability.

TABLE 6

Rheology of samples after static aging at 300° F. for 2 weeks

| Fann 35 | STH#2 | STH#5 | STH#6 |
|---|---|---|---|
| 600 RPM | 420 | 244 | 260 |
| 300 RPM | 303 | 176 | 175 |
| 200 RPM | 252 | 143 | 155 |
| 100 RPM | 186 | 102 | 110 |
| 6 RPM | 78 | 34 | 40 |
| 3 RPM | 72 | 30 | 35 |
| PV | 117 | 68 | 85 |
| YP | 186 | 108 | 90 |
| $\tau_0$ | 52.86 | 12.66 | 30.12 |

TABLE 7

Rheology of samples after static aging at 300° F. for 1 month

| Fann 35 | STH#2 | STH#5 | STH#6 |
|---|---|---|---|
| 600 RPM | 366 | 235 | 228 |
| 300 RPM | 252 | 169 | 157 |
| 200 RPM | 213 | 138 | 125 |
| 100 RPM | 153 | 98 | 85 |
| 6 RPM | 60 | 32 | 28 |
| 3 RPM | 54 | 28 | 26 |
| PV | 114 | 66 | 71 |
| YP | 138 | 103 | 86 |
| $\tau_0$ | 44.5 | 11.56 | 15.74 |

Comparing the aging data in Tables 6 and 7, it can be concluded that the AM content in a copolymer should be controlled at 30 wt % or below to provide a more thermally stable copolymer.

Based on above aging results and conclusions, another set of copolymers with 30 wt % of AM was synthesized. The composition of the polymers was shown in Table 8 below. Formula #7 and #8 were chosen to see the effects of further increase of organic crosslinker on the thermal stability of polymers. #9 and #10 were synthesized to compare the effect of VP on thermal stability of the samples.

SafeTherms #7, #8, #9, and #10 were made with corresponding copolymers in Table 8 with the same formulation as shown previously. The static aging at 350° F. was conducted to have quick thermal stability analysis by accelerating the hydrolysis of AM and AMPS at a very high temperature. Tables 9 and 10 listed the rheology of a freshly prepared sample and a sample aged for 2 weeks at 350° F., respectively.

TABLE 8

Formula of tetrapolymers

| Component | #7 | #8 | #9 | #10 |
|---|---|---|---|---|
| AM (wt %) | 30 | 30 | 30 | 30 |
| AMPS (wt %) | 40 | 40 | 45 | 35 |

TABLE 8-continued

Formula of tetrapolymers

| Component | #7 | #8 | #9 | #10 |
|---|---|---|---|---|
| VP (wt %) | 20 | 20 | 20 | 30 |
| TEVS (wt %) | 10 | 10 | 5 | 5 |
| PAE (mol %) | 0.5 | 1.5 | 1.5 | 1.5 |

TABLE 9

Rheology of fresh samples

| Fann 35 | STH#7 | STH#8 | STH#9 | STH#10 |
|---|---|---|---|---|
| 600 RPM | 181 | 229 | 291 | 205 |
| 300 RPM | 122 | 176 | 228 | 160 |
| 200 RPM | 96 | 143 | 178 | 134 |
| 100 RPM | 66 | 108 | 150 | 104 |
| 6 RPM | 26 | 57 | 66 | 52 |
| 3 RPM | 23 | 55 | 63 | 50 |
| PV | 59 | 53 | 63 | 45 |
| YP | 63 | 123 | 165 | 115 |
| $\tau_0$ | 18 | 38.38 | 26.71 | 31.13 |

Comparing the rheology of STH#7 and STH#8, it can be seen that tripling the organic crosslinker in copolymer #8 increases the rheology of STH#8 at low shear dramatically. Replacing 10 wt % AMPS with VP decreases the viscosity of corresponding SafeTherms as seen in Table 9.

TABLE 10

Rheology of samples after static aging at 350° F. for 2 weeks

| Fann 35 | STH#7 |
|---|---|
| 600 RPM | 174 |
| 300 RPM | 117 |
| 200 RPM | 92 |
| 100 RPM | 62 |
| 6 RPM | 19 |
| 3 RPM | 16 |
| PV | 57 |
| YP | 60 |
| $\tau_0$ | 9.85 |

Comparing the rheological data of STH#7 in Tables 9 and 10, the high end rheology remains relatively constant before and after heat aging, but the rheology at low shear decreases by approximately 30%. However, the fluid maintains its integrity. This exhibits a promising result for the application of using the copolymer as high temperature fluid loss control additive in reservoir drill-in fluids (RDFs).

TABLE 11

Grace high temperature rheology of fresh STH#7

| | Pressure | | | | | |
|---|---|---|---|---|---|---|
| | 500 psi | 500 psi | 500 psi | 500 psi | 1000 psi | 1000 psi |
| | Temperature | | | | | |
| | 120° F. | 150° F. | 200° F. | 250° F. | 300° F. | 350° F. |
| 600 RPM | 286.7 | 242.8 | 189.9 | 138.0 | 100.7 | 70.4 |
| 300 RPM | 179.8 | 150.6 | 117.6 | 89.9 | 69.1 | 48.3 |
| 200 RPM | 135.9 | 123.2 | 99.6 | 70.0 | 56.1 | 40.0 |
| 100 RPM | 92.8 | 88.44 | 71.2 | 60.8 | 45.8 | 28.4 |
| 6 RPM | 38.4 | 37.0 | 40.6 | 33.9 | 21.9 | 9.9 |
| 3 RPM | 32.2 | 31.4 | 29.4 | 24.5 | 15.8 | 7.6 |
| PV | 107 | 92 | 72 | 48 | 32 | 22 |

TABLE 11-continued

Grace high temperature rheology of fresh STH#7

| | Pressure | | | | | |
|---|---|---|---|---|---|---|
| | 500 psi | 500 psi | 500 psi | 500 psi | 1000 psi | 1000 psi |
| | | | Temperature | | | |
| | 120° F. | 150° F. | 200° F. | 250° F. | 300° F. | 350° F. |
| YP | 73 | 58 | 45 | 42 | 38 | 27 |
| $\tau_0$ | 31.35 | 32.32 | 34.85 | 28.73 | 16.29 | 5.39 |

Table 11 provides rheological measurements at various temperatures of freshly prepared STH#7. The fluid shows positive rheological profiles for insulating packer fluid applications within a wide range of temperatures from 120 to 300° F. indicated by the slightly drop down of rheology at low shear with the increasing of temperature. Even at high temperatures up to 300° F., the 3 RPM reading is still maintained at 15.8 bl/100 ft². The rheological profile at 350° F. shows positive properties for RDF viscosifier and fluid loss control additive applications. Some of the RDF fluid loss test results support the positive performance of synthetic copolymers disclosed herein as compared to other commercially available polymers.

TABLE 12

Rheology of STH#2 after static aging at 250° F. for different period of time

| | STH#2 | | | | |
|---|---|---|---|---|---|
| Fann 35 | 2 month | 4 month | 6 month | 8 month | 10 month |
| 600 RPM | 450 | 426 | 423 | 426 | 478 |
| 300 RPM | 321 | 300 | 297 | 300 | 339 |
| 200 RPM | 264 | 246 | 246 | 243 | 273 |
| 100 RPM | 195 | 180 | 177 | 177 | 201 |
| 6 RPM | 84 | 78 | 75 | 75 | 81 |
| 3 RPM | 75 | 72 | 69 | 69 | 75 |
| PV | 129 | 126 | 126 | 126 | 139 |
| YP | 192 | 174 | 171 | 174 | 200 |
| $\tau_0$ | 58.95 | 58.87 | 55.67 | 54.60 | 55.11 |

The long term aging tests were conducted on STH#2 extendedly and the aging data were listed in Table 12. This set of data further confirms the long term thermal performance and stability of the synthetic polymer discussed herein at a relatively high temperature (250° F.).

To obtain long term thermally stable polymers at temperature 300° F. and above, polymer with lower acrylamide content (20 wt %) was synthesized. The composition was shown in table 13.

TABLE 13

Formula of tetrapolymer with low AM content

| AM (wt %) | AMPS (wt %) | VP (wt %) | TEVS (wt %) | PAE (mol %) |
|---|---|---|---|---|
| 20 | 40 | 35 | 5 | 1.5 |

Fluid prepared with above polymer was aged at 300° F. and 375° F., respectively. The aging data were shown in Tables 14 and 15. Apparently, the fluid is thermally stable after 7 month aging at 300° F. as seen the rheological aging profile shown in Table 14, which further confirms that lowering the acrylamide content in the polymer increases the thermal its stability. Thus, the long term thermally stable polymer was successfully developed here.

The rheological aging data in Table 15 shows rheology drop down with time at 375° F. However the fluid kept its integrity after 3.5 month aging. This indicates a promising short term application for Drilling Stem Test.

TABLE 14

Rheology of sample after static aging at 300° F. for different period of time

| Fann 35 | 1 month | 3 month | 5 month | 7 month |
|---|---|---|---|---|
| 600 RPM | 558 | 510 | 492 | 519 |
| 300 RPM | 418 | 369 | 345 | 357 |
| 200 RPM | 345 | 306 | 282 | 291 |
| 100 RPM | 252 | 225 | 201 | 210 |
| 6 RPM | 102 | 90 | 81 | 78 |
| 3 RPM | 93 | 84 | 75 | 72 |
| PV | 140 | 141 | 149 | 162 |
| YP | 278 | 228 | 198 | 195 |
| $\tau_0$ | 45.13 | 54.43 | 56.94 | 55.31 |

TABLE 15

Rheology of sample after static aging at 375° F. for different period of time

| Fann 35 | Fresh | 2 weeks | 2 month* | 3.5 month |
|---|---|---|---|---|
| 600 RPM | 354 | 216 | 339 | 228 |
| 300 RPM | 228 | 162 | 228 | 153 |
| 200 RPM | 192 | 135 | 186 | 120 |
| 100 RPM | 147 | 99 | 135 | 81 |
| 6 RPM | 69 | 36 | 48 | 24 |
| 3 RPM | 63 | 30 | 42 | 21 |
| PV | 126 | 54 | 111 | 75 |
| YP | 10 | 108 | 117 | 78 |
| $\tau_0$ | 64.38 | 8.51 | 34.15 | 13.89 |

The packer fluids formulated in accordance with the present disclosure can be used as an insulating packer fluid for temperatures up to 400° F. or greater, providing a constant rheological profile even with prolonged heat aging and under high shear conditions. Further, the packer fluids disclosed herein may comprise organic-inorganic hybrid water soluble polymers with vinyl functional silane as an inorganic component, for example, synthesized by precipitation polymerization. It is believed that such polymers can viscosify the brine, providing a non-sticky structure which provides applications in both insulating packer fluid and drilling fluid.

Thus, materials disclosed herein have exhibit differing characteristics over insulating packer fluids that utilize organic compounds or polymers, which degrade at such extreme conditions and temperatures. The incorporation of inorganic components and/or other thermally stable additives to the synthetic polymer system may provide a water-based insulating packer fluid exhibiting relatively good yield stress ($\tau_o$ greater than 10 bl/100 ft²) and relatively long-term stability at high temperatures (>200 ° F.). Particularly, the use of TEVS may increase thermal stability of wellbore fluids exhibiting a higher $\tau_o$ value as compared to fluids with a linear polymer. In addition, because the rheological profile of the fluids do not change appreciably with high heat or shear, the fluids may also be recaptured and reused for subsequent applications. Generally, fluids disclosed herein have applicability in various areas including, but not limited to, water-based drilling fluids, completion fluids, work-over fluids, reservoir drill-in fluids, fluid loss control pills and perforating fluids.

Fluids disclosed herein may comprise a base fluid, a copolymer, a thermal stabilizer, and a pH buffer. In other embodiments, fluids may comprise brine, a copolymer, a thermal stabilizer, a bridging material, and a fluid loss additive. It has been discovered that certain swellable polymers and/or copolymers may reduce or prevent fluid loss in oil field applications.

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

What is claimed is:

1. A composition comprising:
   a polymer formed from:
   at least one monomer comprising N-vinyl-2-pyrrolidone (VP);
   a first crosslinker having a formula:

wherein each R is selected from H or

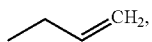

with the provisio that at least two R are

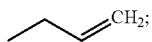

triethoxyvinylsilane (TEVS) as a second crosslinker; and an initiator.

2. The composition of claim 1, wherein the at least one monomer further comprises at least one selected from the group consisting of: 2-acrylamido-2-methylpropanesulfonate (AMPS), acrylamide (AM), methacrylamide N,N dimethyl acrylamide (DMAM), N,N dimethyl methacrylamide, dimethylaminopropyl methacrylamide, N-vinyl-3-methyl-2-pyrrolidone, N-vinyl-4,4-diethyl-2-pyrrolidone, 5-isobutyl-2-pyrrolidone alkyl oxazoline, and 2-ethyl2-oxazoline.

3. The composition of claim 1, wherein the at least one monomer comprises at least one selected from the group consisting of: 2-acrylamido-2-methylpropanesulfonate (AMPS) in amounts from about 5 wt % to 50 wt % of the composition as a whole, acrylamide (AM) in amounts from about 5% to 50 wt % of the composition as a whole, and the N-vinyl-2-pyrrolidone (VP) in amounts from about 1 wt % to 60 wt % of the composition as a whole.

4. The composition of claim 1, wherein the at least one monomer comprises a vinyl amide group where the vinyl group and the amide group are directly bound to one another.

5. The composition of claim 1, wherein the initiator comprises a nitrile functional group.

6. The composition of claim 1, further comprising a fluid comprising a brine in which the polymer is dispersed.

7. The composition of claim 1, further comprising at least one additive selected from the group consisting of: a thermal stabilizer, a pH buffer, a bridging material, and a fluid loss additive.

8. The composition of claim 1, wherein the at least one monomer consists of 2-acrylamido-2-methylpropanesulfonate (AMPS) in amounts from about 5 wt % to 50 wt % of the composition as a whole, acrylamide (AM) in amounts from about 5% to 50 wt % of the composition as a whole, and the N-vinyl-2-pyrrolidone (VP) in amounts from about 1 wt % to 60 wt % of the composition as a whole.

9. The composition of claim 1, wherein the N-vinyl-2-pyrrolidone (VP) is in amounts from about 1 wt % to 60 wt % of the composition as a whole.

* * * * *